United States Patent

Whetstone et al.

[15] 3,648,277

[45] Mar. 7, 1972

[54] MAGNETIC GRAPHICAL DATA DEVICE

[72] Inventors: Albert L. Whetstone, Southport, Conn.; Samuel Fine, New City, N.Y.

[73] Assignee: Science Accessories Corporation, Southport, Conn.

[22] Filed: July 21, 1970

[21] Appl. No.: 56,868

[52] U.S. Cl. ....... 340/347 AD, 33/1 M, 178/18, 235/61.6 A

[51] Int. Cl. ....... G06g 7/04, H03k 13/02

[58] Field of Search ....... 340/347 AD, 347 P, 173 AM, 340/173 MS, 174 VB; 178/18, 19, 20; 33/1 M, 1 CC, 125, 125 W; 235/151.11, 151.11 PL, 61.6 A, 61.6 B; 250/220 SP, 93 H, 83 HP, 203, 208, 209; 346/33

[56] References Cited

UNITED STATES PATENTS

| | | | |
|---|---|---|---|
| 2,686,222 | 8/1954 | Walker et al. | 178/19 |
| 3,440,643 | 4/1969 | Teager | 340/347 AD |
| 3,466,646 | 9/1969 | Lewin | 340/347 P |

*Primary Examiner*—Maynard R. Wilbur
*Assistant Examiner*—Michael K. Wolensky
*Attorney*—Frank R. Trifari

[57] ABSTRACT

A coordinate digitizing device is provided with a localized source of magnetic energy positioned with respect to a wire array, each of said wires terminated in a common delay line. The magnetic energy is pulsed at a desired point, initiating a digitization time interval required for a pulse appearing along a wire of the array to traverse the delay line and reach a device for terminating digitization, and is an indication of the relative digital magnitude representative of the magnetic pulse device's position above the array.

8 Claims, 14 Drawing Figures

Patented March 7, 1972 3,648,277

5 Sheets-Sheet 1

Figure 1:
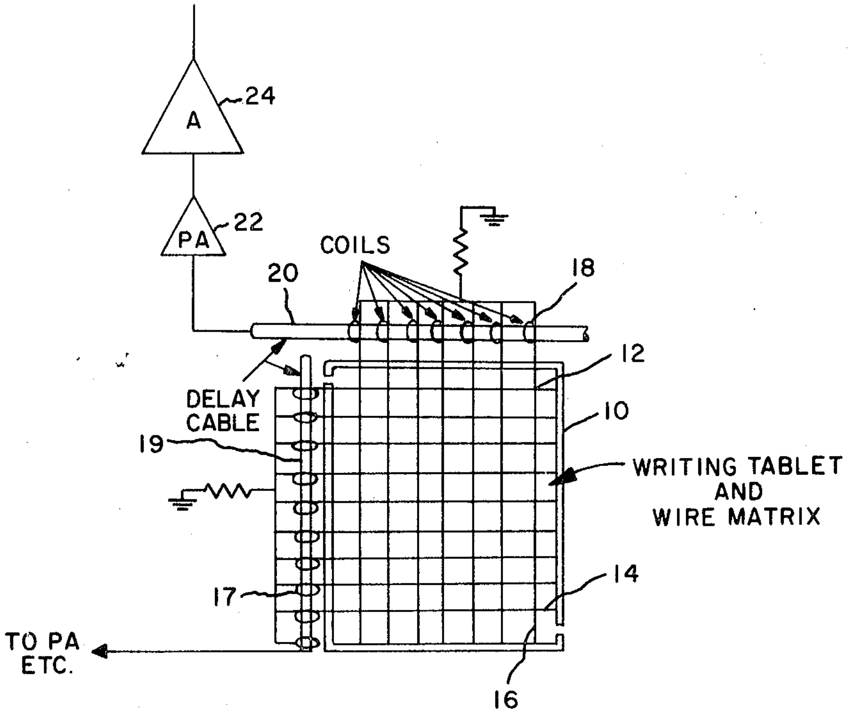

INVENTORS
ALBERT L. WHETSTONE
SAMUEL FINE
BY
AGENT

INVENTORS
ALBERT L. WHETSTONE
SAMUEL FINE
BY
[signature]
AGENT

INVENTORS
ALBERT L. WHETSTONE
SAMUEL FINE
BY [signature]
AGENT

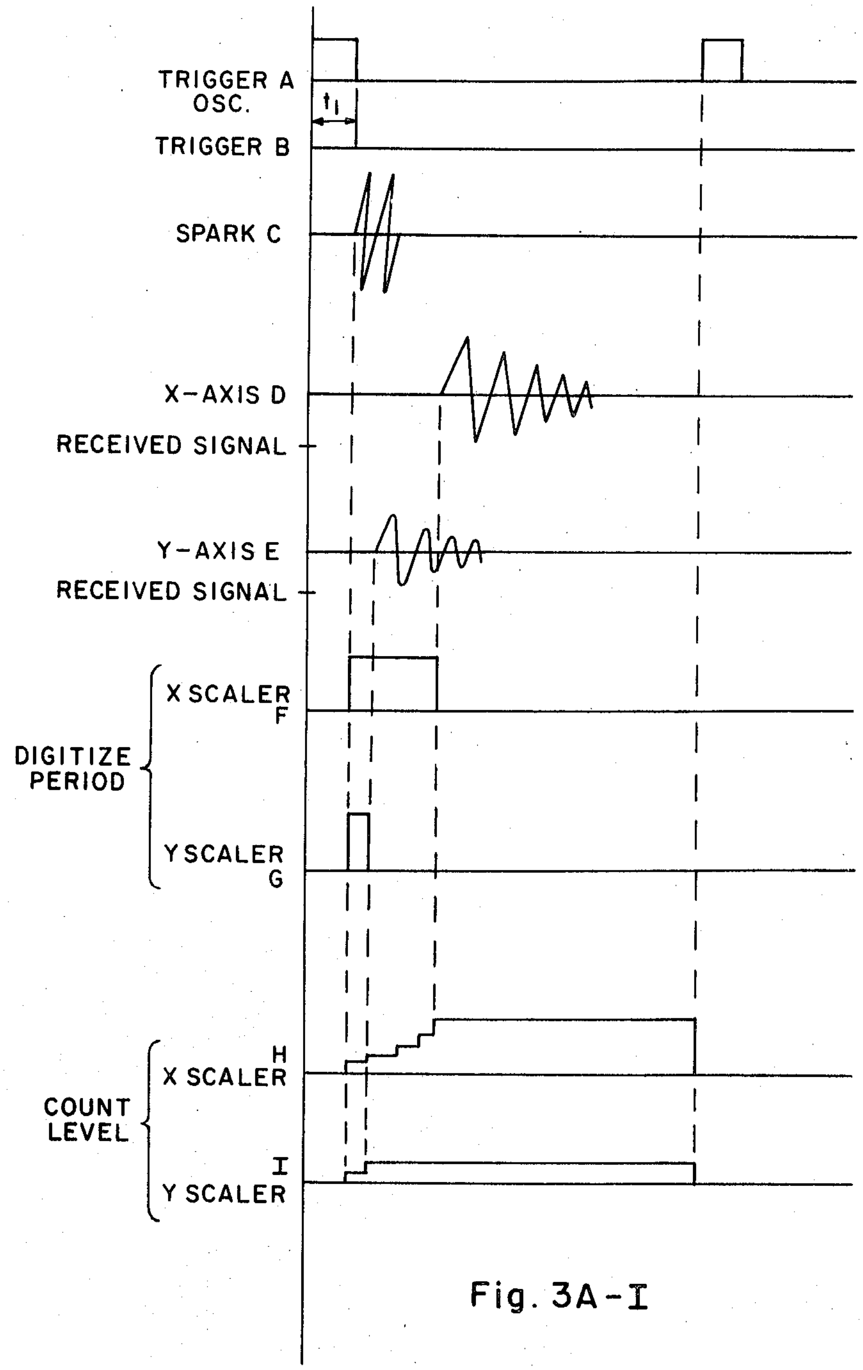
Fig. 3A-I
INVENTORS
ALBERT L. WHETSTONE
SAMUEL FINE
BY
AGENT

INVENTORS
ALBERT L. WHETSTONE
SAMUEL FINE
BY
AGENT

MAGNETIC GRAPHICAL DATA DEVICE

This invention relates to coordinate digitalization devices and more particularly to coordinate digitization employing magnetic pulse generation.

Graphical data devices are commonly employed in such areas as facsimile transmission and in computer data input devices. The earlier forms of such devices employed a stylus in the form of a writing pen or pointer mechanically coupled to a set of arms for translating the movement of the stylus into a sequence of usable information signals. Such arrangements are unsatisfactory in that they present undesirable frictional and inertial limitations. Sheet resistance material has been employed to provide an X/Y coordinate indication but has presented resolution and uniformity problems giving rise to erroneous information.

Light pen systems require interaction with cathode-ray tube display screens and are limited in usefulness. Attempts at employing sonic transducer coordinate devices result in requiring some form of acoustic transmission plate in contact with a vibrating stylus and is functionally limited in that the stylus must make direct contact with the acoustic transmission medium (usually a glass plate) without the intervention of a damping medium such as a sheet of paper. Also, the need for tuned crystal pickups acoustically coupled through the glass plate requires extensive construction and expensive components.

In the present invention a magnetic pulse provides an induced electrical pulse into a position in an array located in proximity with a magnetic field generating device. The device may be in the form of a stylus energizable by a series of pulses or individual pulses as desired.

The array may be a plurality of parallel lines, or a plurality of intersecting coordinate, or matrix, lines. The lines terminate in receivers preferably in the form of delay lines.

Each receiver is coupled to a data digitizer which senses the time duration between each pulse generation and reception at a respective data unit, and provides a data signal representative of such duration. The duration is a measure of the various elapsed times taken by the induced magnetic pulse to travel along the respective receiver from a coordinate axis to an appropriate data unit and thereby provides an effective indication of the position of the stylus with respect to the reference dimensions.

The data of the graphic device can be fed to a computer memory for temporary or permanent storage and retrieval when desired. By storing, and later retrieving, the image can be recalled for display on a suitable cathode-ray tube device. The data can also be fed directly to a display device by conversion of the digitized signals to analog magnitudes and displayed as a continuous series of signals on the face of a cathode ray tube display.

It is therefore an object of the present invention to provide an improved coordinate data device.

It is another object of this invention to provide a graphical data device employing magnetic pulse generation and pickup on a coordinate basis.

It is still a further object of the invention to provide a graphical data device employing a magnetic pulse created by electrical pulses at or near the tip of the stylus.

It is a still further object of the invention to provide a coordinate data device having high accuracy, reliability and with a degree of economy heretofore unattainable.

Figure 2:
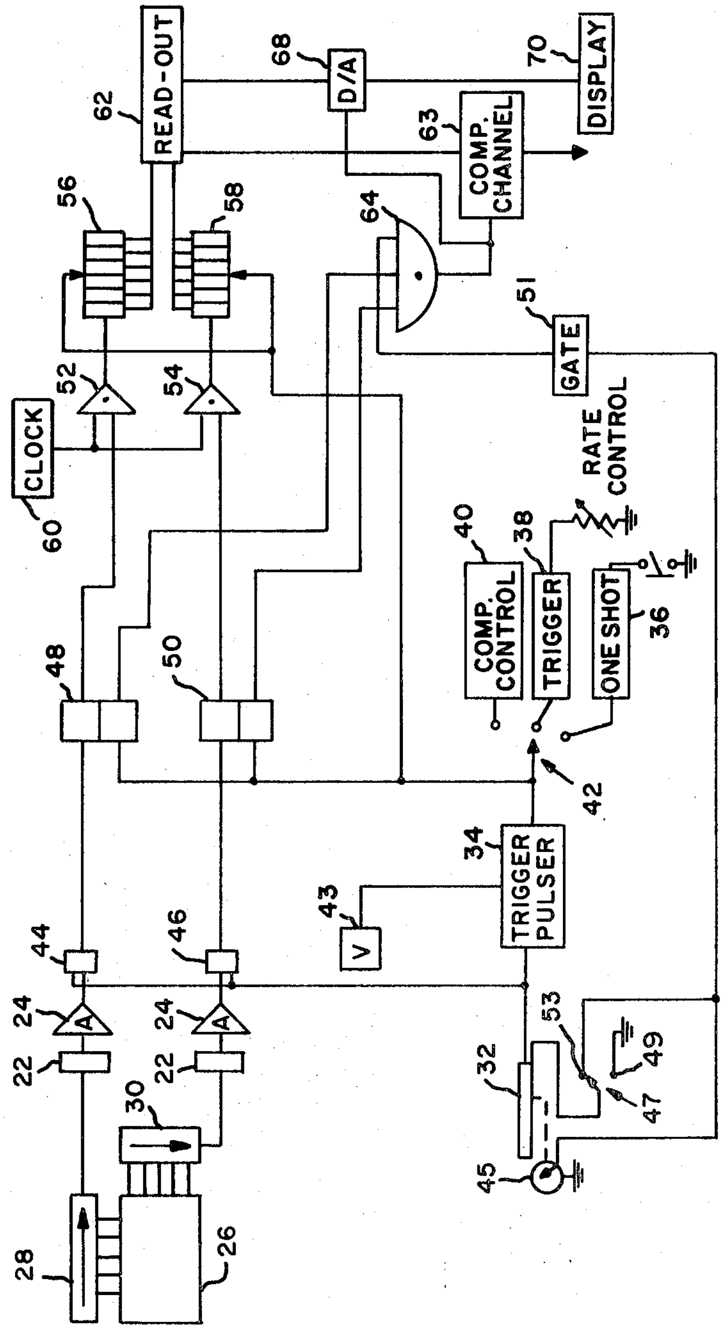
Figure 3:
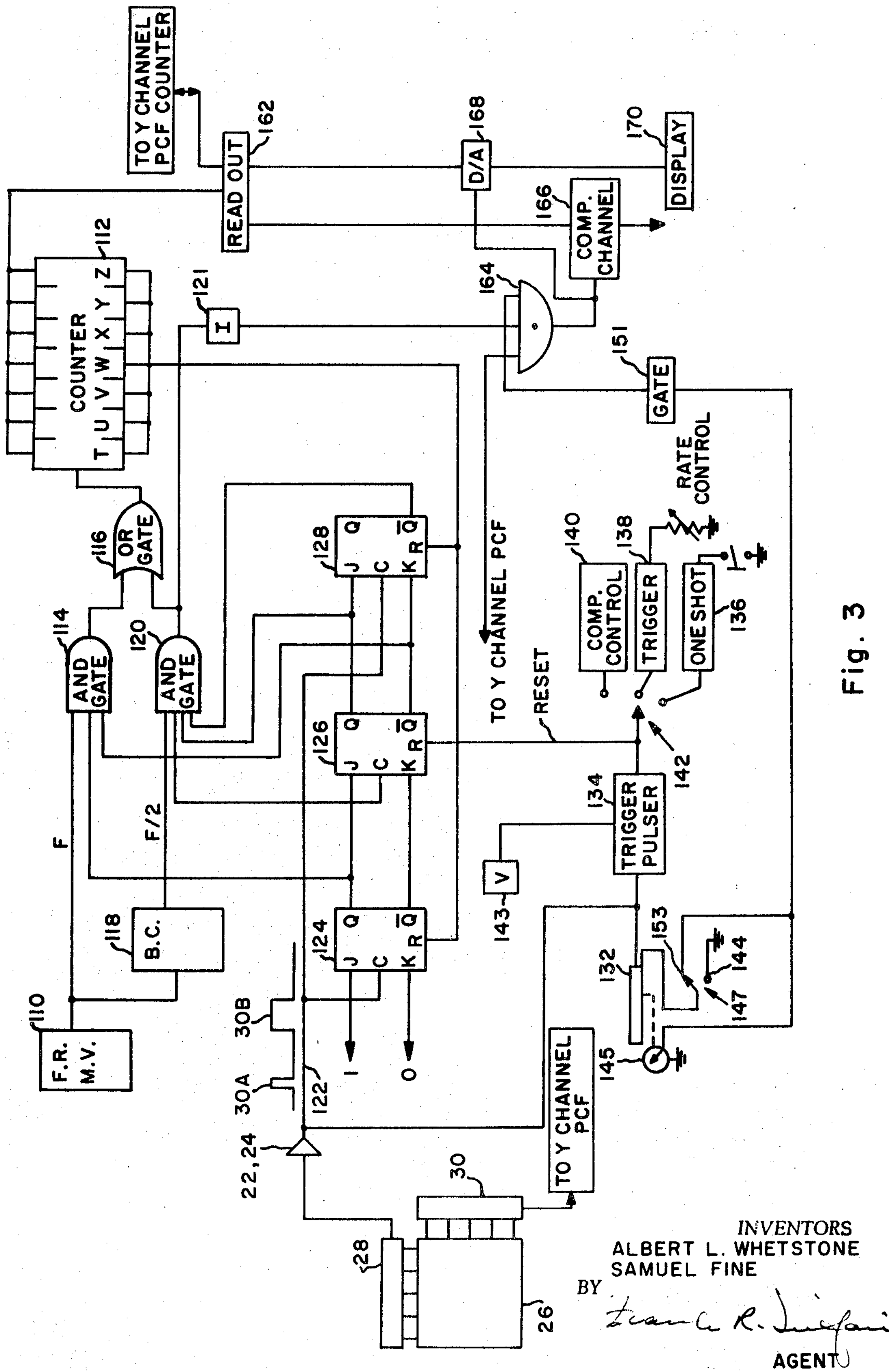
Figure 4:
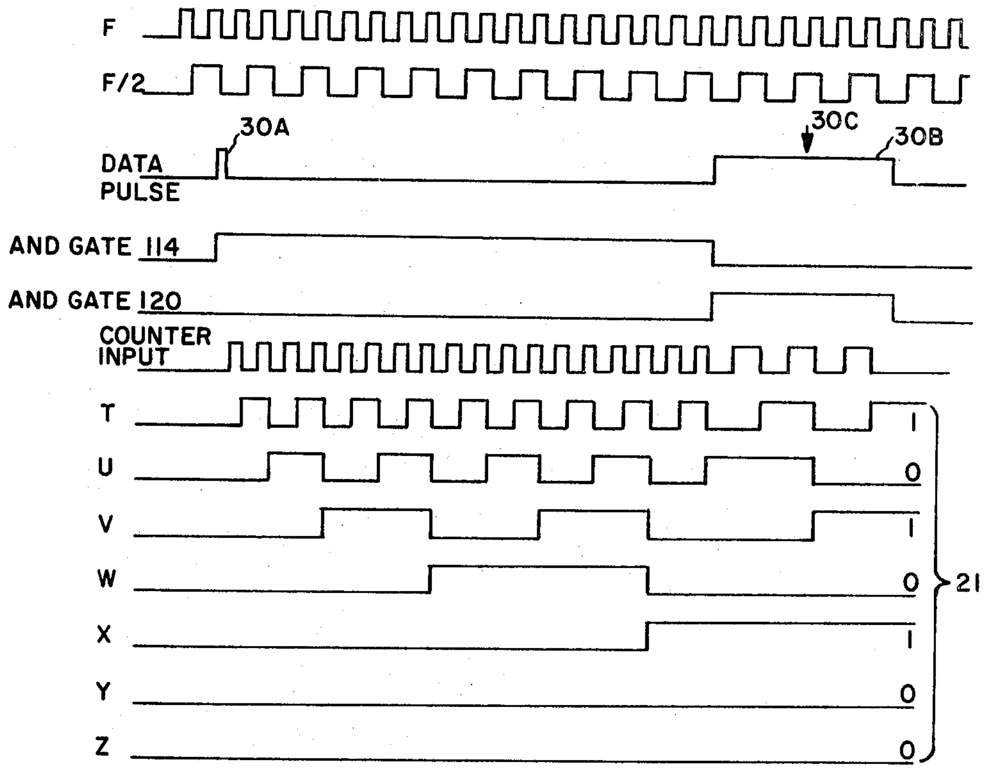
Figure 5:
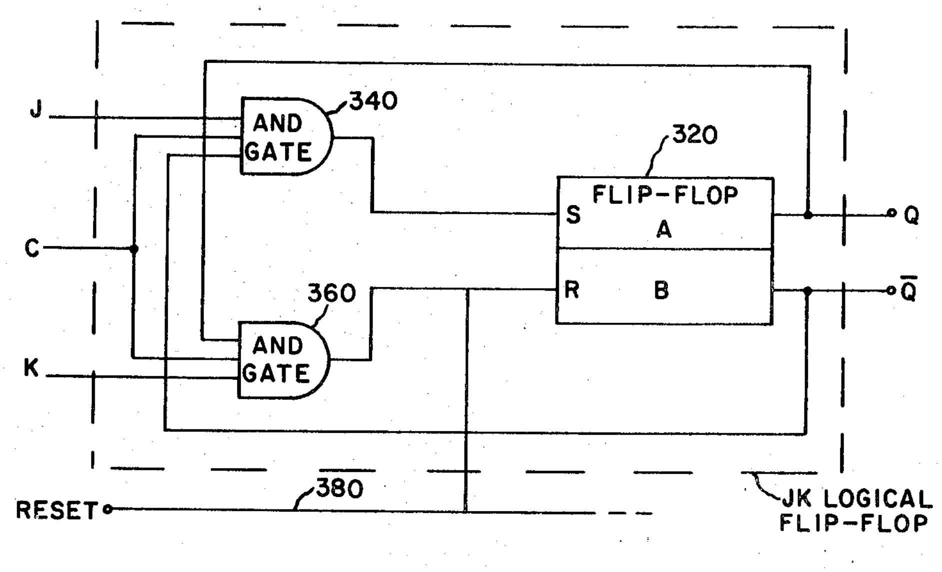

The forgoing objects and brief description as well as further objects will become apparent from the following description with reference to the attached drawings wherein FIG. 1 shows a writing tablet in accordance with the invention, FIG. 2 is a block diagram of the circuit in accordance with the invention, FIG. 3 shows a single channel diagram with a pulse center finder circuit, FIG. 3A–I is a waveform diagram of the device operation, FIG. 4 is a waveform diagram of the pulse center finder and FIG. 5 is an example of the JK flip-flop of FIG. 3.

Referring to FIG. 1 a writing tablet 10 and wire matrix 12 is illustrated as having a plurality of rows 14 and columns 16 terminated in appropriate coils 17 and 18 surrounding an electrical delay receptor means, delay cables 19 and 20. The wires are each coiled around the delay cable at spaced intervals along the length of the delay line. Each delay cable 20 is coupled through a preamplifier 22 into a amplifier 24 and then to suitable logic circuitry for implementing the delay function of the device. It will be understood that the delay lines need not be used but that an appropriate shifting circuit such as in the nature of a stepping register may be employed under the control of a fixed clock pulse for determining the amount of delay time necessary to shift the pulse appearing along a predetermined array line through the sequence of registers to an appropriate output, represented in FIG. 1 by the preamplifier and amplifier device output line.

Referring now to FIG. 2, the two dimensional graphical data device is shown. The data surface 26 is bordered by X and Y delay lines 28 and 30 with arrows indicating the direction of data flow. The stylus 32 is triggered by a trigger pulser 34 is any form of conventional trigger generator, and the trigger pulser is powered by a voltage source 43. The stylus is merely a conventional penlike structure having a coil or other field generating means at the tip and connected by a conductor to the power source 34–43. The trigger pulses can be energized any number of ways, such as the one-shot trigger 36 producing single magnetic field producing pulses and which may be manually controlled, a rate variable free running trigger oscillator 38 for producing a series of field producing pulses, and a computer input 40 which enables field generation to be controlled externally. The one-shot 36 and free-running oscillator 38 may be of a conventional variety. The computer control terminal 40 can be from any externally applied means for generating trigger signals as desired. A mode selection switch 42 couples the desired variety of input to the trigger pulser.

The X–Y delay lines 28 and 30 are respectively coupled through preamplifiers 22 and amplifier 24 to pulse center finders (PCF) 44 and 46. Since the field induces a primary voltage pulse and secondary pulses, the center finders will permit accurate timing of the duration from the moment of field generation to the centroid of the primary (first) pulse received from the delay line. The center finders further act to block out all signals after location of the centroid until generation of the next successive field produced. The primary pulse appears at a predetermined location with respect to the array, the closest pair of intersecting row and column lines to the stylus. The secondary pulses result from pickup by conductors in the array adjacent to the closest pair of conductors. To insure rapid operation, the amplifiers include threshold discriminators which provide an output pulse with steep leading edges in response to the input thereto exceeding a predetermined level.

The output of the respective pulse center finders 44 and 46 are coupled to the respective inputs of a conventional bistable flip-flop network 48 and 50. One output of each flip-flop is gated through gates 52 and 54 into X-channel and Y-channel counters or scalers 56 and 58. The gates 52 and 54 respectively receive a clock input from a clock pulse generator 60. The counter outputs are coupled to a readout unit 62 which may be any conventional form of interim storage device or transfer register.

The external source initiation of a trigger signal passing through the switch 42 (FIG. 3A) acts to trigger a pulse from pulser 34 (FIG. 3B) and initiate a field (FIG. 3C). The trigger signal is also conducted simultaneously to each of the flip-flops 48 and 50 and acts to reset the scalers 56 and 58. The effect of the trigger signal on flip-flops 48 and 50 is to set each flip-flop in a state permitting the AND-gates 52 and 54 coupled thereto to pass clock pulses from the clock source 60. The scalers each begin to accumulate a digital count (FIGS. 3F and 3G; FIGS. 3H and 3I). The count continues to accumulate until an appropriate signal is received from the delay lines 28 and 30. (FIG. 3D and 3E). The leading edge of the respective coordinate signal received acts to reset the state of the appropriate flip-flop 48 and 50 and thereby block the AND-gate 52 and 54 coupled thereto; holding the flow of clock pulses and ceasing the scaler accumulation. The period between trigger pulses in sufficient to allow the received signals to damp out. The scaler reset operation is effected on the leading edge of the trigger pulse (FIG. 3A) and the unblocking of the AND-gates on the trailing edge. The trigger pulse has a duration of $t_1$ and thus results in creating a "dead space" or margin at a distance from each microphone equal to the ratio of the time $t_1$ to the delay time transmission factor of the delay line. Thus, for example, if the reset pulse duration is 40 microseconds, and the delay line factor is 75 microseconds per inch, the effective margin area is approximately one-half inch.

The complimentary outputs of flip-flops 48 and 50 are respectively coupled to an additional AND-gate 64. This latter gate is coincidentally energized only during the period after the count accumulation is complete but before the reset period when both flip-flops 48 and 50 are in the reset state. This provides a "data ready" indication which can be utilized for transferring the accumulated count to an appropriate output.

As shown, the gate 64 can energize a computer channel 66 which can receive the data from the readout unit 62, or a digit to analog conversion unit 68 which can convert the digitization to a series of analog voltages for display on a cathode-ray screen 70. The latter can be a storage unit, thereby allowing continuous readout and permanent screen storage for observation.

A pressure switch 45 contained within the stylus 32 can be arranged so as to cause several varied operations. For example, a mode switch is provided and sets the stylus for receiving trigger pulse, from pulser 34, in two modes. A first position 49 connects the pulses to the field generation continuously. This, a continuous digitization of the spark is provided regardless of whether the stylus is on or off the data surface. Readout of digitization however does not occur until pressure switch 45 is activated, thereby allowing gate 64 to become unblocked by virtue of activation of a gate source 51. In the second mode, switch 47 is in position 53. In this position, both generation and readout only occur when the pressure switch 45 is activated.

A suitable pulse center finder which may be incorporated into the present invention is illustrated in FIGS. 3–5.

Referring to FIG. 3, a source 110 provides a series of counting pulses with a frequency or repetition rate determined by such factors as the switching speed of the system components and the resolution desired in the actual measurements. The source itself may actually comprise any desired pulse producing arrangement, such as a conventional free running multivibrator. A multistage counter 112 receives the pulses from the source 110 through a multiinput coincident AND-gate 114 and an OR-gate 116. The gates 114 and 116 are of conventional design, the AND-gate 114 producing an output only when there is a coincidence of inputs thereto, and the OR-gate 116 producing an output when there is an input on any or all of its input lines.

The output of the source 110 is further connected to the input of a binary countdown stage 118. The function of the binary countdown stage is to provide a series of pulses having a repetition rate precisely half that appearing at its input. The stage 118 may consist of any conventional frequency dividing network, as for example, a bistable "toggle" flip-flop. The pulses occurring at the output of the binary countdown state 118 are coupled to the counter 112 through an AND-gate 120 and the OR-gate 16.

Data pulses 30A and 30B, appearing along the input line 122, are introduced to a series of logical J–K flip-flops 124, 126, and 128. Each of the logical flip-flops include a J input, a K input, a clock input, a reset line and a pair of complementary output terminals. The first logical flip-flop 124 has its J and K terminals steered to the binary conditions 1 and 0 respectively. The 1 and 0 designations refer to the relative condition in each of the stages in the flip-flops. The inputs J and K of the logical flip-flop 126 are steered to the outputs of the logical flip-flop 124, while the J and K inputs of the logical flip-flop 128 are steered to the outputs of the logical flip-flop 126.

In operation, each of the flip-flops are reset by means of a suitable pulse on the reset line such that each of the flip-flops is in 0 state. In this condition, each output Q of each flip-flop is set to 0, while each output Q is set to 1. For simplicity, the condition of a flip-flop will be referred to by the condition of its output Q, the output Q being understood as the complement of output Q. Since a 0 output from the flip-flops 124 and 126 are each respectively connected to an input of the AND-gates 114 and 120 each of these gates is inhibited, and the counter is not receiving counting pulses from the source 110. Since the J–K logical flip-flop 124 is steered to a 1 condition, by virtue of the preset inputs on the J–K input lines, the appearance of the first initial data pulse 30A along the line 122 will cause the flip-flop 124 to revert from its 0 state to a 1 state. In this condition the output Q will be a 1 whereas the output Q will be a 0. Because the J–K input of the flip-flop 124 is steered to a 1 condition, further pulses appearing along the clock input of the flip-flop 124 will have no effect on its condition. Since the output Q of the flip-flop 124 is now in a 1 condition, while the output Q of the flip-flop 126 remains in a 1 condition, the AND-gate 114 now has a coincidence of inputs on all of its input lines, and the pulses appearing from the source 110 will now pass through the AND-gate 114, the OR-gate 116 and into the counter 112. The counter 112 will then begin counting at a rate corresponding to a frequency F of the pulses from the source 110, as illustrated in FIG. 4. The counter will continue to count at the rate F until the appearance of a subsequent data pulse 30B along the line 122. Because of the steered input of flip-flop 124, the subsequent pulse will have no effect thereon. Logical flip-flop 126 however, the input of which is now steered to a 1 corresponding to the output of flip-flop 124, will undergo a change of stage from its former 0 condition to a 1 condition. As a result, the output Q of the flip-flop 126 is now in a 1 condition, whereas the output Q of the flip-flop 126 is in a 0 condition. Since the output Q of the flip-flop 126 is coupled to the input of the AND-gate 114, the flow of pulses from the source 110 to the counter 112 will thus be inhibited.

The AND-gate 120, receiving inputs from the pulse divider 118, the input line 112, and the output Q of logical flip-flop 128, is gated on, and pulses appearing at one-half the former rate are gated through the OR-gate 116 into the counter 112. Since the output of a single flip-flop 126 is used to gate the gates 120 and 114, the switching of the count rate occurs as a single simultaneous operation. Counter 112 continues to count at one-half its former rate for the duration of the subsequent data pulse 30B, until the trailing edge of the data pulse is reached. Since the input pulse line 122 forms one of the inputs of the AND-gate 120, the disappearance of the subsequent data pulse effectively inhibits the AND-gate 120 and blocks the flow of pulses through to the counter. At this point the accumulated store in the counter represents the binary equivalent of the distance from the initial pulse to the effective center 30C of the subsequent data pulse 30B. As illustrated in FIG. 4, assuming for purposes of illustration of pulse repetition rate illustrated therein as F, an examination of the number of pulses F occurring between the initial data pulse 124 and the effective center 132 of the data pulse 126 shows approximately 21 pulses. The counter input, as illustrated in FIG. 4, must therefore receive a total of 21 input pulses in accordance with the present invention. This is reflected by the binary conditions of the stages T through Z of the binary counter 112.

Referring again to FIG. 3, isolation of the counter from the effect of further pulses appearing along the input line 122 is accomplished by means of a logical flip-flop 128. Since the input of the logical flip-flop 128 is steered to a 1 condition by the output of logical flip-flop 126, a further pulse appearing along the input line 122 into the clock input of the logical flip-flop 128 will cause the flip-flop 128 to revert to a 1 condition, thereby providing a Q output of 0, which is in turn coupled to the input of the AND-gate 120. The 0 input of the AND-gate 120 effectively inhibits the gate and prevents the appearance of a pulse along the line 122 from allowing pulses appearing from pulse divider 118 to pass through the counter 112.

A suitable form of J–K flip-flop used in accordance with the present invention is illustrated in FIG. 5. As shown, a logical J–K flip-flop is formed with a conventional bistable flip-flop 320 having a first and second stages A and B, and AND-gate 340 and an AND-gate 360. For purposes of this example it will be assumed that either of the stages A and B of the flip-flop 320 will assume a 1 condition in accordance with the presence of an input pulse thereto. Thus, the appearance of a pulse along the reset line 380, applied to the input of the stage B of the flip-flop 320, will result in the stage B being set to a 1 and the stage A being set to a 0. If the inputs J and K, as shown in FIG. 3, are preset to a 1 and a 0 respectively, the appearance of a pulse along the clock input line C will result in the AND-gate 340 being enabled as passing a pulse therethrough to the stage A of the flip-flop 320, thereby changing the state of the flip-flop 320 to a condition resulting in a 1 in the stage A and a 0 in the stage B. Since the K input remains fixed to a 0 condition, the appearance of further input pulses along the line C will have no effect on the condition of the flip-flop 320. Only the appearance of a subsequent pulse along the reset line 380 will result in the flip-flop 320 being reverted to its original condition.

It is understood that although AND-OR terminology is employed, NAND-NOR logic may obviously be utilized as well.

Integration of the pulse center finder logic into the coordinate digitization system is shown in FIG. 3.

For simplicity of illustration, only a single channel digitizer (the X-channel) is shown. Energization of the stylus 132 results in a pulse originating as desired from either one shot 136, trigger 138 or computer control 140 passing through switch 142 and along the reset line to the logic circuit and the counter 112 for resetting. The pulse also energizes the trigger pulser 134 which produces an energizing pulse at the tip of the stylus 132. The energizing pulse is also introduced as pulse 30A along the line 122. The energizing pulse at the tip of the stylus, which is understood to be positioned somewhere above the area 26 produces a magnetic field which induces a data pulse into the wire array underlying the surface 26. The pulse travels to an appropriate point on delay lines 28 and 30 and thence out the ends thereof to appropriate preamplifier and amplifier units 22 and 24, and then along line 122 as the data pulse 30B.

The logic circuit performs as described above to produce a digitization representing the time from the leading edge of pulse 30A to the center of pulse 30B. When the trailing edge of pulse 30B occurs, an output of AND-gate 164 to permit the computer channel 166 or the digital to Analog Converter 168 to interrogate the counter 112 via readout unit 162 for data or display purposes. Of course, the equivalent operation takes place in the Y-channel logic.

The readout can be controlled via switch 147 to take place continuously or only upon switching through contacts 144 and 153, as described in FIG. 2.

For operations involving single dimensions, such as card readers, only a single channel need be used and the stylus can provide the requisite field in the presence of a punched area.

Other variations and modifications are clearly encompassed within the inventive scope and although certain embodiments and descriptions have been provided, it is to be understood that various further modifications, omissions and refinements which depart from the disclosed exemplary embodiments may be adopted without departing from the spirit or scope of the invention.

What is claimed:

1. A digitizer comprising first means for generating a magnetic field, a table *t* having an array of wires forming a part thereof, electrical delay receptor means coupled to said array of wires, second means for triggering the production of a magnetic field by said first means, said first means occupying a predetermined coordinate location with respect to said array, said magnetic field inducing a pulse in said array, third means responsive to said second means for initiating a digitization, said third means coupled to said receptor and responsive to receipt of a pulse from said receptor for terminating said digitization, said third means thereby providing a digitization of the location of said first means with respect to said array.

2. The combination of claim 1 wherein said electrical delay receptor means is a delay line, each of said array wires being inductively coupled thereto at spaced intervals along the length of said line.

3. A position digitizer comprising first means for generating a magnetic field, a tablet having an array of wires forming a part thereof, electrical delay receptor means coupled to said array of wires, second means coupled to said first means for triggering the production of a magnetic field by said first means, said first means occupying a predetermined coordinate location with respect to said array, said magnetic field inducing a primary pulse in the closest wire of said array with respect to said first means, pulse center finder means coupled to said electrical delay receptor means and to said second means for providing an output representative of the time elapsed between the triggering of said magnetic field and the centroid of said primary pulse, and a counter coupled to said pulse center finder means and responsive to said output for continuously storing a digitization proportional thereto and third means coupled to said counter and to said pulse center finder means and responsive to the termination of said primary pulse for terminating said digitization and providing a readout of the count stored in said counter.

4. The combination of claim 3 wherein said pulse center finder is an arrangement for measuring the spacing between an initial pulse and the effective time center of a subsequent pulse of variable width, comprising a source of pulses having a predetermined repetition rate, frequency dividing means coupled to said source for reducing said predetermined repetition rate by half, first gating means coupling said source to said counter, second gating means coupling said frequency dividing means to said counter, a first logic circuit having first and second inputs steered to fixed values and having a third input responsive to said initial pulse for providing a first output condition, a second logic circuit having first and second inputs steered to the output and complement thereof of said first logic circuit and a third input responsive to the leading edge of said subsequent pulse for providing a second output condition and a complement thereof, said first gating means enabled by said first output condition of said first logic circuit for coupling said source to said counter, said second output condition and complement thereof coupled to respective inputs of said first and second gating means and operative to simultaneously inhibit said first gating means and enable said second gating means for coupling said frequency dividing means to said counter, and means responsive to the termination of said subsequent pulse for inhibiting said second gating means.

5. The combination of claim 3 wherein said electrical delay receptor means is a delay line, each of said array wires being inductively coupled thereto at spaced intervals along the length of said line.

6. A coordinate digitizer comprising first means for generating a magnetic field, a tablet having an array of wires arranged in mutually intersecting rows and columns, first electrical delay receptor means terminating all of the row wires of said array, second electrical delay receptor means terminating all of the column wires of said array, second means coupled to said first means for triggering the production of a magnetic field by said first means, said first means occupying a predetermined coordinate location with respect to said array, said magnetic field inducing a primary pulse in the closest pair of row and column wires of said array with respect to said first means, each electrical delay receptor means coupled to the respective row and column wires of said array responsive to receipt of said pulse along one of said wires to provide a time delay to said pulse proportional to the distance of the wire providing said pulse from the output position of said electrical delay receptor means, a pulse center finder means coupled to each of said electrical delay receptor means and to said second means for providing an output representative of the time elapsed between the triggering of said magnetic field and the centroid of the primary pulse with regard to the respective row and column wire positions energized, a counter coupled to each of said pulse center finder means and responsive to said output for continuously storing a digitization proportional thereto, third means coupled to each said counter and to each said pulse center finder means and responsive to the termination of said primary pulse for terminating said digitization and providing a readout of the current stored in each of said counter, thereby providing a digitized coordinate position of said predetermined coordinate location, and means responsive to said second means for resetting each of said counters preparatory to the next coordinate digitization.

7. The combination of claim 6 wherein each of said electrical delay receptor means is a delay line, each of said array wires being inductively coupled thereto at spaced intervals along the length of said line.

8. The combination of claim 6 wherein each said pulse center finder is an arrangement for measuring the spacing between an initial pulse and the effective time center of a subsequent pulse of variable width, comprising a source of pulses having a predetermined repetition rate, frequency dividing means coupled to said source for reducing said predetermined repetition rate by half, first gating means coupling said source to said counter, second gating means coupling said frequency to said counter, a first logic circuit having first and second inputs steered to fixed values and having a third input responsive to said initial pulse for providing a first output condition, a second logic circuit having first and second inputs steered to the output and complement thereof of said first logic circuit and a third input responsive to the leading edge of said subsequent pulse for providing a second output condition and a complement thereof, said first gating means enabled by said first output condition of said first logic circuit for coupling said source to said counter, said second output condition and complement thereof coupled to respective inputs of said first and second gating means and operative to simultaneously inhibit said first gating means and enable said second gating means for coupling said frequency dividing means to said counter, and means responsive to the termination of said subsequent pulse for inhibiting said second gating means.

* * * * *